Oct. 13, 1970          A. H. BOBECK          3,534,347
SINGLE WALL DOMAIN PROPAGATION ARRANGEMENT
Filed May 28, 1968                              3 Sheets-Sheet 1
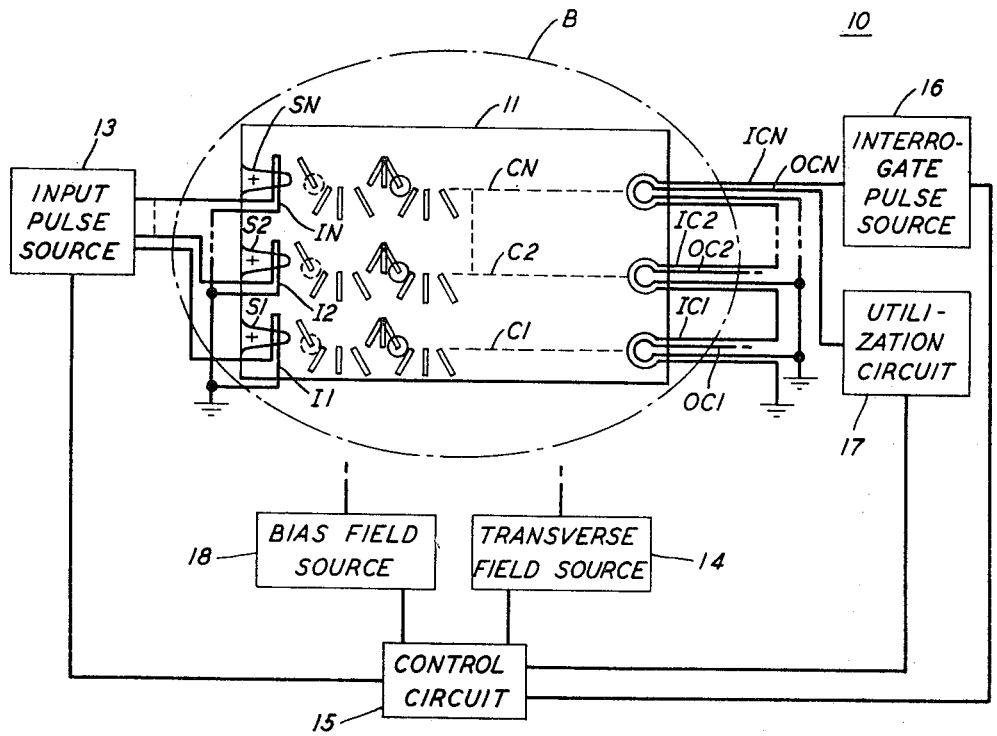
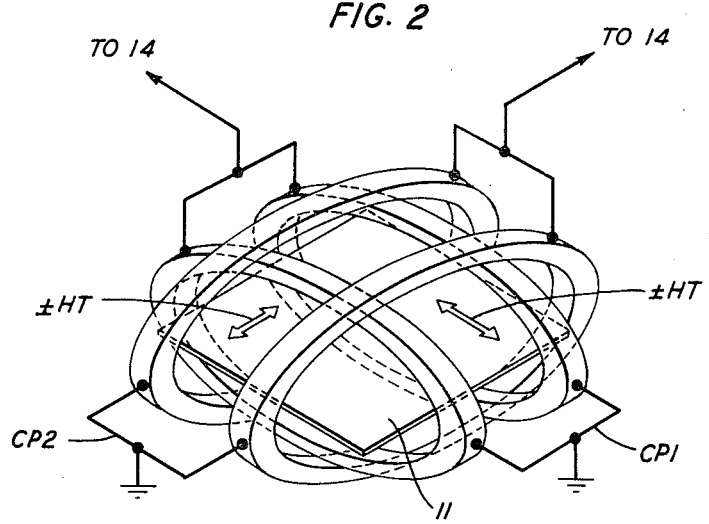
INVENTOR
A. H. BOBECK
BY
Herbert M. Shapiro
ATTORNEY _United States Patent Office_

3,534,347
Patented Oct. 13, 1970

1

3,534,347
SINGLE WALL DOMAIN PROPAGATION
ARRANGEMENT
Andrew H. Bobeck, Chatham, N.J., assignor to Bell Telephone Laboratories, Incorporated, Murray Hill, N.J.,
a corporation of New York
Filed May 28, 1968, Ser. No. 732,705
Int. Cl. G11c *11/14, 19/00*
U.S. Cl. 340—174                                    5 Claims

ABSTRACT OF THE DISCLOSURE

Patterns of magnetic material contiguous the surface of a sheet of material in which single wall domains can be propagated have been found to provide magnetic pole patterns which change in response to a field rotating through 360 degrees in the plane of the sheet. The changing pole pattern provides attracting propagation fields for moving single wall domains in the sheet from input to output positions thus permitting shift register operation in the absence of discrete propagation conductors.

FIELD OF THE INVENTION

This invention relates to domain propagation arrangement and, more particularly, to arrangements in which single wall domains are propagated in a sheet of magnetic material.

BACKGROUND OF THE INVENTION

A single wall domain is a reverse-magnetized region encompassed by a domain wall which closes on itself to form, illustratively, a cylindrical geometry, the diameter of which is a function of the material parameters. Inasmuch as the boundary of the domain is independent of the boundary of the sheet, multidimensional movement of the domain can be realized.

A simple convention permits the visualization of a single wall domain. Most sheets of material in which a single wall domain can be moved are characterized by a preferred direction of magnetization normal to the plane of the sheet. We may designate positive and negative directions for the magnetization up out of and down into the plane of the sheet, respectively. A single wall domain in this context may be visualized as an encircled plus sign and the magnetization in the remainder of the sheet may be represented by minus signs. The Bell System Technical Journal (BSTJ), volume 46, No. 8, October 1967, pages 1901 et seq., describes single wall domains, various operations employing the movement of single wall domains, and suitable material in which those domains can be moved.

Selective movement of a single wall domain is realized by the generation of a localized attracting field (viz, field gradient) at a position offset from the position occupied by a domain. In accordance with the assumed convention, a discrete conductor in the form of a loop coupled to a position offset from that occupied by a domain generates an appropriately placed positive field (up out of the plane) when pulsed. The domain moves to the position of the field in response.

When an attempt is made to miniaturize single wall domain devices, it is realized that single wall domains can be obtained with geometries far smaller than the circuitry required to move them. There are a variety of reasons for this. The loop shape geometry of the propagation conductors, for example, occupies more space than, say, a single conductor. Moreover, drive wiring economy and the need to provide directionality in the propagation channels necessitate three-phase propagation

2 pulsing as is well understood. Consequently, only one position in three may be occupied by a domain in practice although those positions may overlay one another. Further, drive current carrying requirements dictate minimum cross-sections for conductors. But photodeposition techniques do not permit closely spaced conductors to have disproportionate widths and thicknesses without risking short circuits between adjacent conductors. As a result, as much as ten mils are allocated per bit location, yet domains of the order of microns can be realized.

An object of this invention is to provide a domain propagation device in which single wall domains can be propagated in the absence of propagation conductors.

BRIEF DESCRIPTION OF THE INVENTION

The invention is based on the discovery that a variety of Permalloy patterns, on the surface of a sheet of magnetic material in which single wall domains can be moved, exhibit changing magnetic pole patterns in response to a field rotating through 360 degrees in the plane of that sheet. It has been found further that those patterns can be chosen such that a single wall domain can be made to follow those changing pole patterns from an input to an output position in the absence of discrete propagation conductors.

In one embodiment of this invention, a plurality of rectangular layers of Permalloy is deposited on a surface of a sheet of thulium orthoferrite. Next adjacent layers are oriented illustratively at about sixty degrees with respect to one another. A negative bias field (normal to the plane of the sheet) maintains a specified diameter for single wall domains in the sheet. A rotating "traverse" field is provided in the plane of the sheet. Domains have been observed to follow the most closely disposed negative poles from layer to layer towards an output position.

In another embodiment, Permalloy rectangles, consecutive ones of which are at ninety degrees with respect to one another, have been observed to perform as in the previous embodiment to move single wall domains in response to a rotating transverse field.

A feature of this invention is a domain propagation arrangement including a magnetic sheet in which single wall domains can be moved, spaced apart magnetic patterns on the surface of that sheet for supporting changing magnetic pole patterns in response to a rotating transverse field, and means for generating a transverse field rotating through 360 degrees in the sheet.

BRIEF DESCRIPTION OF THE DRAWING

FIG. 1 is a schematic illustration of an arrangement in accordance with this invention;

FIG. 2 is a schematic illustration of a portion of the arrangement of FIG. 1;

DETAILED DESCRIPTION

Figure 3A:
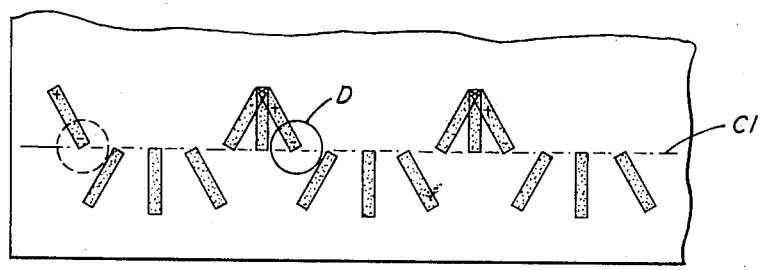
FIGS. 3A–3D and 5A–5D are schematic illustrations of consecutive pole configurations and domain dispositions in response to the transverse fields of FIGS. 4A–4D and 6A–6D, respectively.
Figure 3B:
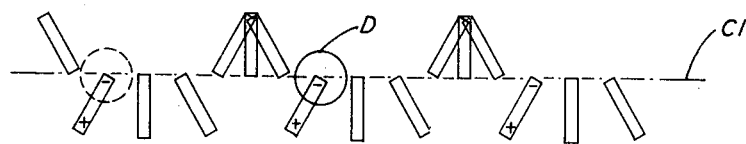

FIG. 1 shows a domain propagation arrangement 10 in accordance with this invention. The arrangement includes a sheet of magnetic material 11 in which single wall domains can be moved.

A plurality of channels, C1, C2 . . . CN, for domain propagation are defined in sheet 11.

Input positions for the channels are defined by sources S1, S2 . . . SN. The sources are regions of positive magnetization, the shapes of which may be maintained constant by conductors (not shown) outlining the sources and having an appropriately poled current flowing therein. Such a source arrangement is described in copending application, Ser. No. 579,931, filed Sept. 16, 1966 for A. H. Bobeck, U. F. Gianola, R. C. Sherwood and W. Shockley now Pat. No. 3,460,116.

Hairpin-shaped input conductors I1, I2 . . . IN overlie correspondingly designated sources in a manner to sever from those sources small portions thereof when conductors are pulsed to generate a field which is negative between the legs of the hairpin for the convention adopted herein. Each input conductor is connected between an input pulse source 13 and ground.

The propagation channels for domains severed from sources S are defined by patterns of magnetic material. The material for the patterns may comprise a soft magnetic material as, for example, thin films of 80 Ni–20 Fe Permalloy.

FIG. 1 shows one of these patterns as comprising Permalloy rectangular depositions disposed successively at angles of sixty degrees with respect to one another. A domain is moved along a channel by following the attracting pole patterns generated in the Permalloy layers by a rotating transverse field.

The rotating transverse field is generated, illustratively, by pairs of Helmholtz coils CP1 and CP2 arranged as shown in FIG. 2. The Helmholtz coils are connected between a "transverse field" source 14 and ground as shown in FIGS. 1 and 2. The coil pairs are pulsed, in a manner well understood in the art, to generate a field HT in consecutive positions, as shown hereinafter in the plane of sheet 11. Source 14 is taken to include switching apparatus for properly driving the coil pairs to this end.

FIGS. 3A through 3D show the movement of a domain along a Permalloy pattern which defines a representative channel C1 of FIG. 1. FIGS. 4A through 4D show the transverse field orientations for the domain positions in correspondingly lettered figures 3. A minus sign indicates an attracting pole concentration for Permalloy patterns on the top surface of sheet 11, as shown in FIG. 1.

Figure 4A:
FIGS. 4A–4D and 6A–6D are schematic representations of the orientations of a transverse field during operation in accordance with this invention.

FIG. 3A shows a domain D centered about a minus sign at the tip of a Permalloy rectangle which is sloping downward and to the right as viewed in the figure. It may be seen that all Permalloy rectangles so sloped in the figure have plus and minus signals at opposite ends thereof. The plus and minus signs represent most intense magnetic pole concentrations generated by the transverse magnetic field HT represented by an arrow also designated HT, as shown in FIG. 4A oriented as are the Permalloy rectangles. We will assume that the field HT, generated by the coils of FIG. 2, is being rotated counterclockwise, as indicated by the curved undesignated arrows in FIGS. 4A through 4D.

Figure 4B:
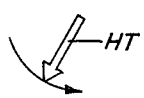

FIG. 4B shows the arrow HT directed downward and to the left. The most intense poles in channel C1 now appear in similarly oriented Permalloy rectangles as shown by the plus and minus signs in FIG. 3B. The domain D moves to the nearest minus sign for the convention employed herein.

Figure 3C:
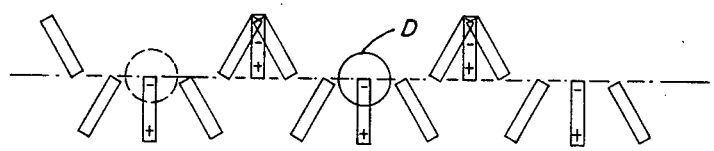
Figure 4C:
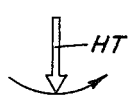

FIG. 4C shows the transverse field rotated to the downward position. The most intense poles again change as shown in FIG. 3C. The domain D moves accordingly.

Figure 3D:
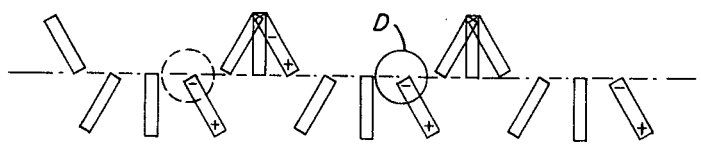
Figure 4D:
Figure 6A:
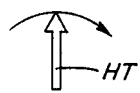
Figure 6B:
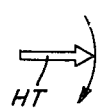
Figure 6C:
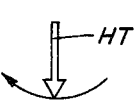
Figure 6D:
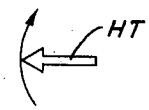

FIG. 4D shows the transverse field rotated downwards and to the right. The domain D moves further to the right as shown in FIG. 3D.

A comparison between FIGS. 3A, 3B, 3C, and 3D shows that domain D moves to the right as the transverse field rotates counterclockwise. The domain continues to so move as the transverse field rotates further, as is clear from the figures also. It is to be appreciated that the same domain would move to the left if the transverse field is rotated clockwise.

All domains in a channel move synchronously in response to the rotating transverse fields. Thus, a glance at FIG. 3A indicates that a domain may occupy each position along the broken line identified by the channel notation (C1) where a minus sign is shown. The input circuitry is synchronized with the transverse field for introducing domains at the proper time. As an example, a domain may be introduced into the position of the leftmost minus sign as shown in FIG. 3A when the domain D is advanced to the position shown for it there. Sources 13 and 14 are connected to a control circuit 15 in order to provide the necessary synchronization.

Of course, an input pulse on conductor I1 may be absent when an appropriate time for introducing domains is provided. In such a circumstance, no domain is provided. But this absence of a domain is propagated, as are domains, along the propagation channel. The absence of a domain is shown in FIGS. 3A through 3D as a broken circle. The presence and absence of domains may be taken to represent a binary one and a binary zero, respectively. The information represented by the presence and absence of domains is, therefore, propagated along propagation channels in response to consecutive rotations of the transverse fields to associated output positions.

The output positions are defined by interrogate conductors IC1, IC2 . . . ICN, as shown in FIG. 1. Each interrogate conductor includes a loop, which, conveniently, couples a last position which a domain can occupy in a channel. The interrogate conductors are connected illustratively in series between an interrogate pulse source 16 and ground and operate to collapse domains in the so coupled positions when pulsed.

Output conductors OC1, OC2 . . . OCN are also coupled to like designated output positions. The output conductors are connected between a utilization circuit 17 and ground. When a pulse in the interrogate conductors collapses a domain in an output position, the associated output conductor applies a pulse to the utilization circuit. Once again the interrogate pulse is applied and the utilization circuit is enabled in synchronism with the rotations of the transverse field. Source 16 and circuit 17 are connected to control circuit 15 for the proper control.

The input, propagation, and detection of information represented by the presence and absence of domains has now been described. It is to be made clear that the domains so moved have diameters determined by a bias field essentially normal to sheet 11 and of a polarity to contract domains. A block 18 in FIG. 1 represents the bias field source (and is so designated). The source may comprise a coil positioned in the plane of sheet 11 conveniently along a path defined by broken circle B for generating the appropriate field. Source 18 is connected to control circuit 15 for control of the magnitude of the bias field.

FIGS. 5A through 5D show an alternative Permalloy pattern for supporting a pole pattern changing in response to a rotating transverse field. Next consecutive legs of the pattern are at 90 degrees to one another, deposited conveniently as a T shape and a bar. The transverse field, shown in FIGS. 6A–6D, is rotating, clockwise in this instance, to consecutive orientations at 90 degrees with respect to one another. A domain D is seen to move from left to right as viewed in successive FIGS. 5A, 5B, 5C, and 5D in a manner analogous to that described in connection with FIGS. 3A–3D. The minus signs in those figures again represent the most intense pole concentrations to which the domains are attracted.

A reversal of the direction of rotation of the transverse field causes the domain to move from right to left as viewed. A domain, however, may be made to move in either direction along a channel without a reversal of the clockwise or counterclockwise rotation of a transverse field. The Permalloy pattern, for example, may provide for the most closely spaced attracting pole to be displaced to the right in one channel and to the left in the next adjacent channels simultaneously (compare FIGS. 3A–3D and 4A–4D to FIGS. 5A–5D and 6A–6D).

Figure 5A:
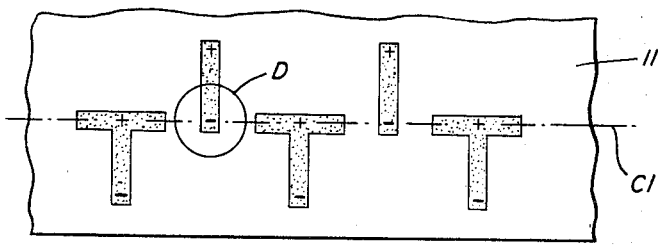
Figure 5B:
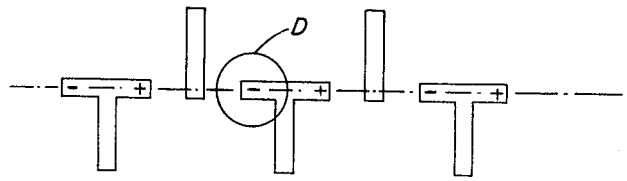
Figure 5C:
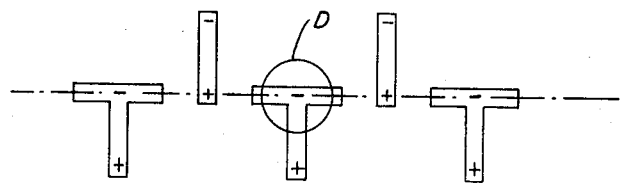
Figure 5D:
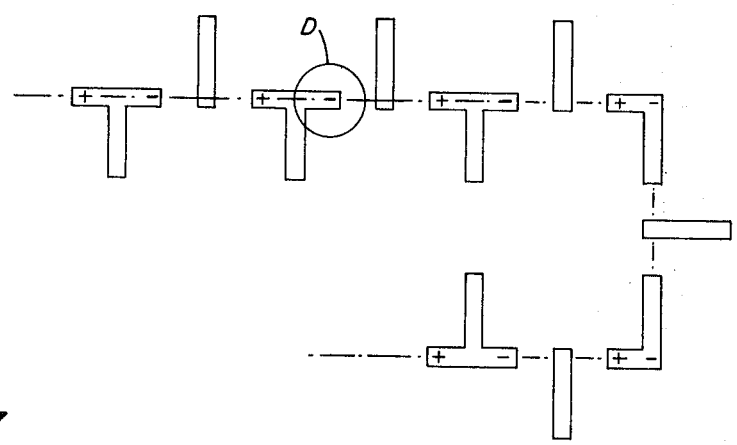

The ends of these channels may, further, be connected, tail-in-mouth, for providing recirculating channels for domains in response to rotating transverse fields. FIG. 5D shows a Permalloy pattern with which the recirculating operation may be realized. Of course, the Permalloy pattern for permitting recirculation of information can be generalized to a form to permit movement of domains in X and Y directions anywhere in sheet 11.

Figure 7:
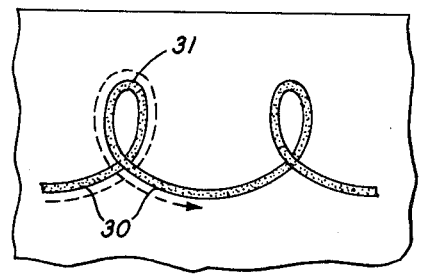
FIG. 7 is a portion of an alternative pole-bearing configuration in accordance with this invention.

FIG. 7 shows, schematically, an alternative Permalloy pattern for supporting the changing pole configurations in response to rotating transverse fields. Specifically, FIG. 7 shows a zig-zag Permalloy pattern 30 with which a closed oval Permalloy path 31 is associated. The attracting pole patterns advance, as indicated, by a dotted line shown along a leg of pattern 30 and proceeding around the associated path 31 before proceeding along the next leg of pattern 30 as the transverse field is rotated counterclockwise.

A specific illustration of an arrangement in accordance with this invention provides an appreciation for the practicality of such an arrangement. A Permalloy pattern 5,000 angstrom units thick and comprising evenly spaced rectangles five by two mils deposited on a sheet of thulium orthoferrite, as shown in FIG. 1, provides a propagation channel for domains having diameters of four mils as determined by a bias field of 30 oersteds. A repeat of 24 mils for the pattern indicates a repeat-to-domain diameter relationship of six to one. A transverse field of 20 oersteds rotating at 10 kilocycles provides suitable propagation. Other Permalloy patterns provide a repeat-to-domain diameter ratio of three to one. In either case, for domains having diameters of the order of a micron, packing densities of more than a million per square inch can be realized. The overlay pattern can be controlled to, the order of microns, thus permitting such high packing densities to be realized.

Selectivity in domain movement can also be achieved. Domains are moved by changing pole patterns. The strength of the poles in the overlay is controlled by the geometry of the Permalloy. For example, the thickness of the Permalloy determines the pole strength. Selectivity of domain movement, then, can be achieved by making the Permalloy pattern thinner in one channel than in another. The magnitude of the rotating transverse field may be regulated for selecting a channel for propagation. Transverse field source 14 may be taken to include control circuitry for regulating the magnitude of the transverse field to this end. Selective movement of domains in this manner is discussed more fully in copending application Ser. No. 726,454, filed May 3, 1968, for A. J. Perneski.

What has been described is considered only illustrative of the principles of this invention. Accordingly, numerous other embodiments can be devised by one skilled in the art without departing from the spirit and scope thereof.

What is claimed is:

1. A domain propagation arrangement comprising a sheet of magnetic material in which single wall domains can be moved, said material having a preferred direction of magnetization substantially normal to the plane of said sheet, means for providing a field substantially normal to the plane of said sheet and of a polarity to contract domains to specified diameter, a first magnetic layer adjacent said sheet for defining a propagation channel for domains in said sheet, said layer being of a material and having a geometry comprising consecutive portions each disposed with respect to adjacent portions thereof in a manner to exhibit magnetic pole variations in response to a magnetic field rotating in the plane of said sheet for attracting domains to consecutive positions therealong, and means for generating a magnetic field rotating through 360 degrees in the plane of said sheet.

2. An arrangement in accordance with claim 1 wherein said first magnetic layer is patterned to form a plurality of spaced apart repetitive geometries between input and output positions for domains in said sheet, means for introducing domains at input positions in said sheet, and means for detecting the presence and absence of domains in said sheet, wherein said means for generating comprises first means for generating a first field in the plane of said sheet, second means for generating a second field in the plane of said sheet perpendicular to said first field, and means for driving said first and second means in a manner to generate a field which rotates in the plane of said sheet to consecutive orientations through 360 degrees.

3. An arrangement in accordance with claim 2 wherein said magnetic layer comprises spaced apart rectangles of Permalloy each oriented at 60 degrees with respect to the next adjacent rectangles.

4. An arrangement in accordance with claim 2 wherein said magnetic layer comprises spaced apart rectangles of Permalloy oriented at 90 degrees with respect to one another.

5. An arrangement in accordance with claim 1 also including a second magnetic layer of similar geometry to that of said first layer and oriented transverse to said first layer.

References Cited
UNITED STATES PATENTS

| | | | |
|---|---|---|---|
| 3,148,360 | 9/1964 | Hale | 340—174 |
| 3,284,783 | 11/1966 | Davis | 340—174 |
| 3,460,116 | 8/1969 | Bobeck et al. | 340—174 |

STANLEY U. URYNOWICZ, Primary Examiner